Figure 1:
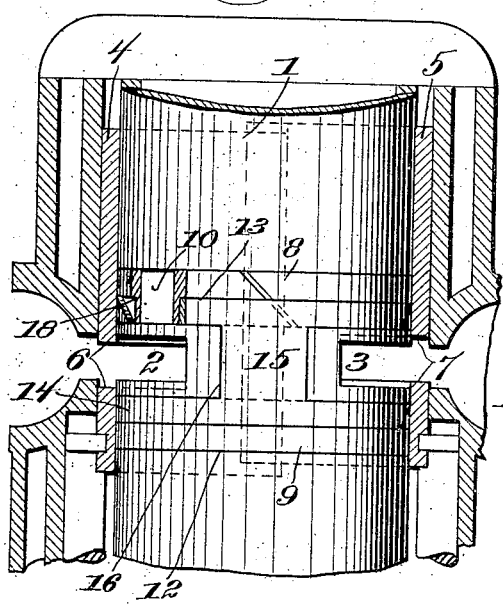

M. E. KNIGHT.
PACKING RING.
APPLICATION FILED JUNE 6, 1912.

1,086,299.

Patented Feb. 3, 1914.

Witnesses:
Jas. F. Maloney.

Inventor:
Margaret E. Knight,
by her Atty.

UNITED STATES PATENT OFFICE.

MARGARET E. KNIGHT, OF SOUTH FRAMINGHAM, MASSACHUSETTS, ASSIGNOR, BY DIRECT AND MESNE ASSIGNMENTS, TO K-D MOTOR COMPANY, A CORPORATION OF NEW YORK.

PACKING-RING.

1,086,299.

Specification of Letters Patent.

Patented Feb. 3, 1914.

Application filed June 6, 1912. Serial No. 702,067.

*To all whom it may concern:*

Be it known that I, MARGARET E. KNIGHT, a citizen of the United States, residing in South Framingham, in the county of Middlesex and State of Massachusetts, have invented an Improvement in Packing-Rings, of which the following description, in connection with the accompanying drawings, is a specification, like letters on the drawings representing like parts.

The present invention relates to a packing ring, and is embodied in a ring adapted to pack the space around lateral ports in a cylinder between the said cylinder and a cylindrical slide valve or valves in an engine in which the slide valve or valves are concentric with the cylinder, while the ports are controlled by a movement of one part relatively to the other.

It is the purpose of the invention to arrange the packing so that the expanded portions thereof will completely surround the ports, and, in accordance with the invention, the ring is made of several parts, whereby it is easily assembled as a whole, while the separate parts are so arranged as to break joints, so that there is an unbroken packing at every point where leakage might occur.

In the construction shown to illustrate the invention the cylinder is stationary, while the valves consist of longitudinally movable slides fitting the outside of the cylinder and having ports which correspond to ports cut through the cylinder wall at the opposite sides thereof. To contain the packing ring, the cylinder is provided with two annular recesses at opposite sides of the port, the said recesses being joined by longitudinal recesses extending from one annular recess to the other between the ends of the ports. The packing ring is composed of two semi-annular portions each having two half rings joined at the middle by transverse pieces which are adapted to be fitted in the longitudinal recesses, while the semi-annular portions lie in the annular recesses. To complete the packing, I utilize two annular rings adapted substantially to fit the annular recesses the said rings being cut away so as to receive at their outer surfaces the semi-annular rings, the compound annular ring portions thus formed substantially filling the recesses. The said annular rings may be arranged so that the openings at the ends thereof will lie above and below the spaces between the ports at opposite sides of the cylinder, respectively, where the semi-annular rings are unbroken, so that no two joints will come at the same place with relation to the ports.

The expanding pressure of the annular rings forces the semi-annular rings into engagement with the slides, and the large area of contact between the two affords sufficient friction to prevent the annular rings from turning. The semi-annular rings are held from turning through the engagement of the longitudinal parts thereof with the walls of the longitudinal recesses, so that the entire packing, when assembled, is permanently held in the position desired.

Figure 2:
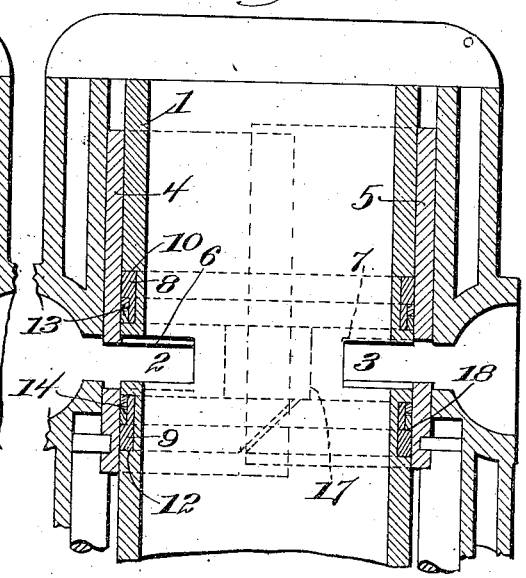
Figure 3:
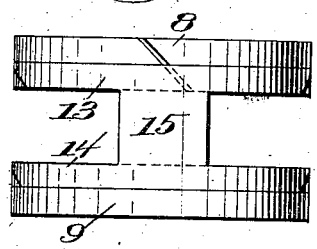
Figure 4:
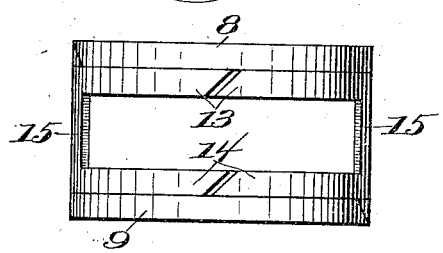
Figure 5:
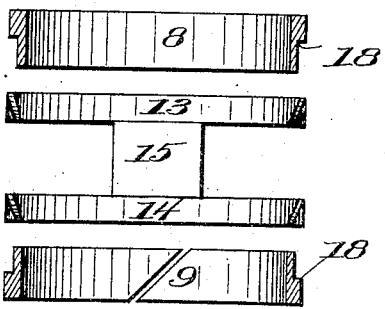
Figure 6:
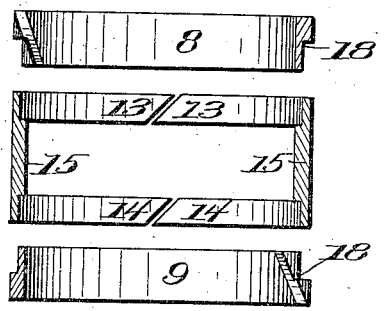

Figure 1 is a sectional view of a construction in which two slide valves are located at opposite sides of the cylinder, the cylinder being shown as provided with a ring embodying this invention, a portion of the ring being broken and shown in section; Fig. 2 is a vertical section through the cylinder, ring and valves; Fig. 3 is a view of the ring assembled and standing in the position shown in Figs. 1 and 2; Fig. 4 is a similar view of the ring assembled, but turned one quarter around; and Figs. 5 and 6 are vertical sectional views showing the several parts of the ring separated and respectively in the position shown in said Figs. 3 and 4.

The invention is shown as embodied in an engine of the type set forth in a prior application filed by me July 8, 1911, Serial No. 637,508, in which the cylinder is stationary and provided with two lateral ports at opposite sides, there being separate slide valves at opposite sides of the cylinder adapted by longitudinal movements to open and close said ports. It is obvious, however, that so far as relates to the construction of the packing ring, the type of engine is immaterial, since the ring can be used in any case where packing is required entirely around a port through a cylindrical member, whether movable or stationary, adapted to be controlled by a valve concentric with the cylindrical surface, and movable with relation thereto to open and close the ports.

Referring to Fig. 1, the cylinder 1 is shown as provided with the lateral ports 2 and 3 which are cut through the walls of the cylinder at opposite sides and adapted to be controlled by concentric sliding members 4 and 5 which have port openings 6 and 7 and are adapted to fit over and be moved longitudinally with relation to the outside of the cylinder 1. In such a construction, it is necessary that the spaces at opposite sides of the ports, as well as the spaces between the ends of the ports, should be tightly closed to prevent the escape of the gases, and in accordance with the invention, these spaces are packed by means of an expanding ring which consists of two semi-annular portions each of which extends half way around the cylinder, and two annular portions each of which extends wholly around the cylinder, the said annular portions 8 and 9 being substantially the same in structure as the ordinary piston ring, and adapted to be spread and sprung into place in the annular recesses 10 and 12 formed in the outside of the cylinder.

The two semi-annular ring portions are each provided with two half rings, 13 and 14, each of which extends half way around the cylinder to enter the annular recesses 10 and 12 above and below the ports 2 and 3, the said half rings being connected by means of longitudinal parts 15 adapted, respectively, to fit and enter longitudinal recesses 16 and 17 which are located at opposite sides of the cylinder between the ports 2 and 3, so that when these rings are in place they are locked in position. To complete the packing, the annular rings, which substantially fit the annular portions of the recess, are provided with under-cut portions 18 along their outer surfaces, adjacent to the ports, to receive the semi-annular rings, so that the compounded rings completely fill the recess, as shown in Figs. 1 and 2.

When the cylinder and valves are to be assembled, the annular rings are sprung into the annular portions of the recess, preferably with their open parts at opposite sides of the cylinder and adjacent to the longitudinal portions of the recess, as shown. The semi-annular rings are then inserted at opposite sides, with their longitudinal portions in the longitudinal parts of the recess. When the valve is in position, the tendency of the annular rings to expand causes all parts of the compound ring to be pressed against the slide, thus securing an effectual packing extending entirely around each port.

What I claim is:

1. A packing ring comprising two semi-annular portions each having two half rings joined by a transverse piece; combined with two complete rings fitting inside of the said half-rings and adapted to expand them into contact with the part which is to be packed.

2. A cylinder having lateral ports and a slide valve controlling said ports, a packing comprising two semi-annular members each having two half rings joined at the middle by a transverse piece, said transverse pieces being adapted to fit longitudinal recesses in the cylinder wall between the ends of the ports, and the half rings being adapted to lie in annular recesses in the cylinder wall above and below the ports; combined with two complete rings adapted to lie in said annular recesses under the half rings, substantially as and for the purpose described.

In testimony whereof, I have signed my name to this specification in the presence of two subscribing witnesses.

MARGARET E. KNIGHT.

Witnesses:
LYNETTE CLARK,
JOHN H. TEMPLE.